April 6, 1943.  T. H. THOMPSON  2,316,114

MACHINE ELEMENT

Filed Feb. 17, 1941

INVENTORS
TOM H. THOMPSON
BY Swan, Frye, & Hardesty
ATTORNEYS

Patented Apr. 6, 1943

2,316,114

UNITED STATES PATENT OFFICE 2,316,114

MACHINE ELEMENT

Tom H. Thompson, Detroit, Mich., assignor by mesne assignments, to Builder-Thompson Engineering and Research Corporation, Detroit, Mich., a corporation of Michigan Application February 17, 1941, Serial No. 379,245

4 Claims. (Cl. 74—52)

The present invention relates to a machine element or mechanical movement for the conversion of rotary motion to straight line reciprocating motion or vice versa.

Among the objects of the invention is a motion converting mechanism which produces a true harmonic motion.

Another object is to produce such conversion with entire elimination of side thrust upon the reciprocating element.

Another object is to increase the efficiency of such devices by maintaining the entire bearing surfaces in full contact at all times.

Still another object is a device of the kind indicated in which anti-friction bearings may be used to decrease the frictional losses.

Other objects and advantages will be apparent to those skilled in the art upon reference to the following drawing and the accompanying specification in which.

Figure 1:
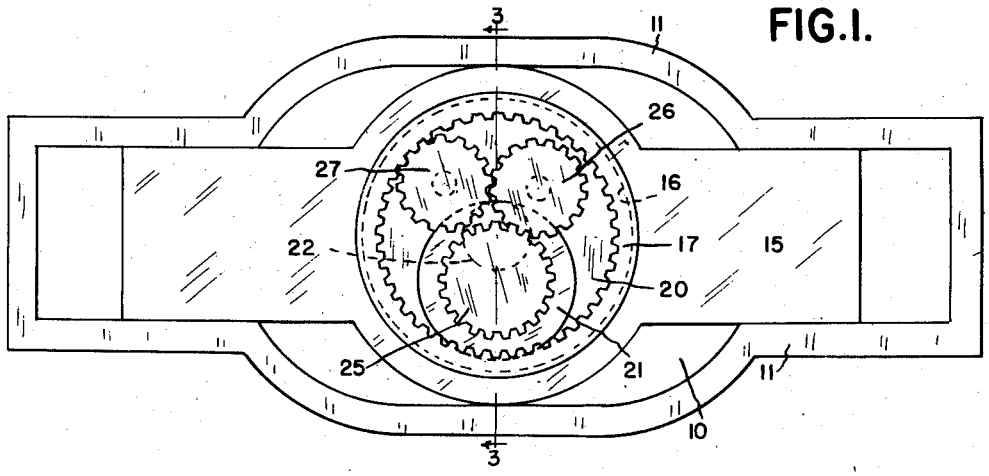
Figure 1 is a plan view of a device embodying the invention and showing the parts in centered position.

In the embodiment of the invention as shown in the drawing, a suitable support is shown at 10. This consists of a plate having a rim flange 11 serving merely to guide the parts to prevent their rotation as a unit due to the small amount of friction necessarily present.

Slidably mounted in the support 10 is a plate 15 provided with a circular centrally located opening 16 around which is an internally toothed ring gear 17 so mounted as to overhang the opening. Rotatably mounted in the opening 16 is a circular cam or eccentric 20, in the eccentrically located opening of which is a second circular cam or eccentric 21 provided with a shaft portion 22 extending through and having a bearing in support 10. Mounted fixedly upon cam 21, which may be called the "primary" cam, is a gear 25 and upon cam 20 the "secondary" cam, are two rotatably mounted gears 26 and 27 of such size and so located that gear 26 meshes with both of gears 25 and 27 while gear 27 meshes with the ring gear 17.

In such an arrangement, when the parts are properly proportioned, rotation of cam 21 and gear 25 will cause the rotation of cam 20 in the opposite direction. These gears, it should be noted, take no part of any load but serve only to fix the timing of and insure the opposite rotation of the cams.

In properly proportioning the several parts, the two cams are so made that they have the same lift and the several gears so proportioned that the two cams are rotated at the same number of revolutions per minute. With the cams of equal lift and their rotation the same, but in opposite directions, it is obvious that they will supplement each other in the direction of reciprocation, as is shown clearly in the drawing, and will have a mutual neutralizing effect along a line at right angles to the line of reciprocation.

Figure 2:
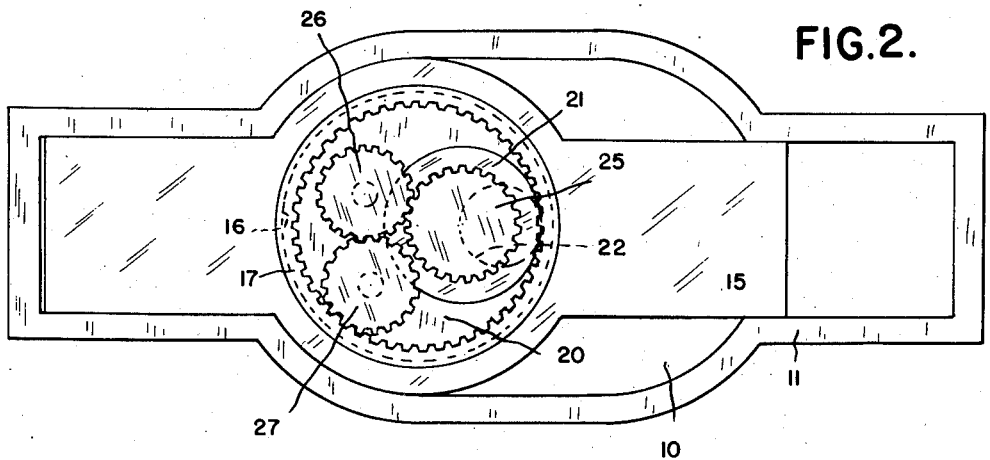
Figure 2 is a similar view but showing the position of the parts at the end of a stroke of the reciprocating element.
Figure 3:
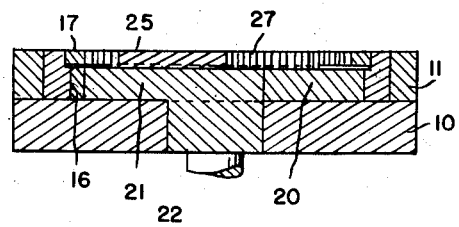
Figure 3 is a section on line 3—3 of Figure 1.

When the cams are in the position shown in Figure 1, the assembly of cams is concentric with shaft 22 and, since the lift of one neutralizes the lift of the other, there is no tendency to produce lateral movement, but both cams, when in motion are acting to move the element 15 toward the end of its stroke. And when the shaft 22 has made a quarter turn to the position of Figure 2, the cams are moved to the position wherein their lifts are added and the assembly assumes its maximum eccentricity with consequent movement of the element 15 to the end of its travel. With the cams moving in opposite directions, all side thrust of one is neutralized by the thrust in the opposite direction of the other.

While the above description relates to conversion of rotary to reciprocating motion, the device may also be used to convert reciprocatory motion into a rotary motion of shaft 22 by application of power to the element 15.

Now having described the invention and the preferred embodiments thereof, it is to be understood that the invention is to be limited, not to the specific details herein set forth, but only by the scope of the claims which follow.

I claim:

1. Mechanism for converting rotary motion to or from reciprocatory motion, comprising driven and driving connections and two circular eccentrics of equal lift, one inside the other, adapted to act one on the other, one of said connections embracing the outer eccentric, in combination with means insuring the relative rotation of the eccentrics in opposite directions.

2. Mechanism for converting rotary motion to or from reciprocatory motion, comprising driven and driving connections and two circular eccentrics of equal lift, one inside the other, adapted to act one on the other, one of said connections embracing the outer eccentric, in combination with means insuring the timing of said eccentrices and the relative rotation thereof in opposite directions.

3. Mechanism for converting rotary motion to or from reciprocatory motion, comprising driven and driving connections and two circular eccentrics of equal lift, one inside the other, adapted to act one on the other, one of said connections embracing the outer eccentric and the other being associated with the inner eccentric, in combination with means insuring relative rotation of the eccentrics in opposite directions at an equal rate.

4. Mechanism for converting rotary motion to or from reciprocatory motion, comprising driven and driving connections and two circular eccentrics of equal lift, one inside the other, adapted to act one on the other, one of said connections embracing the outer eccentric and the other being associated with the inner eccentric, in combination with means for insuring the timing of said eccentrics and the relative rotation thereof in opposite directions, said means consisting of gearing connecting said eccentrics and one of said connections.

TOM H. THOMPSON.